(12) United States Patent
Temple et al.

(10) Patent No.: US 10,063,370 B2
(45) Date of Patent: Aug. 28, 2018

(54) METHOD AND DEVICE FOR CHECKING AN IDENTIFIER

(71) Applicant: Infineon Technologies AG, Neubiberg (DE)

(72) Inventors: Christopher Temple, Munich (DE); Dian Tresna Nugraha, Munich (DE); Edward Wiley, Howell, MI (US); Laurent Heidt, Munich (DE)

(73) Assignee: Infineon Technologies AG, Neubiberg (DE)

( * ) Notice: Subject to any disclaimer, the term of this patent is extended or adjusted under 35 U.S.C. 154(b) by 544 days.

(21) Appl. No.: 14/483,716

(22) Filed: Sep. 11, 2014

(65) Prior Publication Data
US 2016/0080376 A1    Mar. 17, 2016

(51) Int. Cl.
*G06F 21/72* (2013.01)
*H04L 9/00* (2006.01)
*H04L 9/32* (2006.01)

(52) U.S. Cl.
CPC .............. *H04L 9/00* (2013.01); *G06F 21/72* (2013.01); *H04L 9/3234* (2013.01); *G06F 2221/034* (2013.01); *H04L 2209/26* (2013.01)

(58) Field of Classification Search
CPC ..................... G01R 31/317–31/3187
See application file for complete search history.

(56) References Cited

U.S. PATENT DOCUMENTS

| | | | | |
|---|---|---|---|---|
| 5,599,344 | A * | 2/1997 | Paterson | A61B 18/1206 606/32 |
| 6,769,081 | B1 * | 7/2004 | Parulkar | G11C 29/16 714/733 |
| 2006/0016877 | A1 | 1/2006 | Bonalle et al. | |
| 2006/0277244 | A1 * | 12/2006 | Renno | G06F 7/49947 708/552 |
| 2007/0136361 | A1 * | 6/2007 | Lee | G06F 21/64 |
| 2007/0147620 | A1 | 6/2007 | Zheng et al. | |
| 2009/0177356 | A1 | 7/2009 | Plawecki | |
| 2010/0146277 | A1 | 6/2010 | Mochizuki | |
| 2011/0055545 | A1 | 3/2011 | Sovio et al. | |
| 2012/0159274 | A1 * | 6/2012 | Balakrishnan | G01R 31/3187 714/732 |
| 2013/0145447 | A1 * | 6/2013 | Maron | G06F 21/31 726/6 |
| 2013/0254875 | A1 * | 9/2013 | Sama | G06F 21/31 726/19 |

(Continued)

FOREIGN PATENT DOCUMENTS

JP           2012122931 A  *  6/2012

OTHER PUBLICATIONS

U.S. Appl. No. 14/483,645, filed Sep. 11, 2014.

(Continued)

*Primary Examiner* — Farid Homayounmehr
*Assistant Examiner* — Zhimei Zhu
(74) *Attorney, Agent, or Firm* — Eschweiler & Potashnik, LLC (57) ABSTRACT

An embodiment relates to a method for processing data that includes (a) calculating a second identifier based on input data, (b) conducting a first operation comparing the second identifier with a first identifier, and (c) conducting a second operation comparing the second identifier with a modified first identifier.

17 Claims, 3 Drawing Sheets

(56) References Cited

U.S. PATENT DOCUMENTS

| | | |
|---|---|---|
| 2013/0268798 A1 | 10/2013 | Schade et al. |
| 2014/0181933 A1 | 6/2014 | Sanjeev et al. |
| 2014/0285191 A1* | 9/2014 | Kalechofsky .......... G01R 33/36 324/309 |
| 2015/0067328 A1 | 3/2015 | Yin |
| 2015/0175170 A1 | 6/2015 | Aoki |

OTHER PUBLICATIONS

Non-Final Office Action dated Jun. 17, 2016 for U.S. Appl. No. 14/483,645.

Notice of Allowance dated Mar. 10, 2017 in connection with U.S. Appl. No. 14/483,645.

\* cited by examiner

METHOD AND DEVICE FOR CHECKING AN IDENTIFIER

FIELD

Embodiments of the present disclosure in particular relate to processing data, in order to verify an identifier, e.g., signature, between a master processor and a security processor.

SUMMARY

A first embodiment relates to a method for processing data comprising calculating a second identifier based on input data, conducting a first operation comparing the second identifier with a first identifier, and conducting a second operation comparing the second identifier with a modified first identifier.

A second embodiment relates to a device for checking a first identifier, comprising a processing unit that is configured to convey the first identifier and input data to a security processor, and convey a modified first identifier to the security processor. The processing unit is further configured to obtain a first result of a first operation and a second result of a second operation conducted by the security processor, and assess the first result and the second result.

A third embodiment relates to a device for processing data, comprising a processing unit that is configured to obtain a first identifier and input data from a master processor, calculate a second identifier based on the input data, and conduct a first operation comparing the second identifier with the first identifier. The processing unit is further configured to obtain a modified first identifier from the master processor, conduct a second operation comparing the second identifier with the modified first identifier, and convey a result of the first operation and a result of the second operation to the master processor.

It is further noted that the processing unit mentioned herein may comprise at least one, in particular several means that are arranged to execute the acts of the method described herein. The means may be logically or physically separated; in particular several logically separate means could be combined in at least one physical unit.

The processing unit may comprise at least one of the following: a processor, a microcontroller, a hard-wired circuit, an ASIC, an FPGA, a logic device.

A fourth embodiment is directed to a device for checking a first identifier comprising means for obtaining a first identifier and input data from a master processor, means for calculating a second identifier based on the input data, and means for conducting a first operation comparing the second identifier with the first identifier. The device further comprises means for obtaining a modified first identifier from the master processor, means for conducting a second operation comparing the second identifier with the modified first identifier, and means for conveying a result of the first operation and a result of the second operation to the master processor.

A fifth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Automotive Safety Integrity Level (ASIL) is a risk classification scheme defined by the ISO 26262—Functional Safety for Road Vehicles standard, which is an adaptation of the Safety Integrity Level used in IEC 61508 for the automotive industry. The ASIL is established by performing a risk analysis of a potential hazard by looking at the Severity, Exposure and Controllability of the vehicle operating scenario. There are four ASILs identified by the standard: ASIL A, ASIL B, ASIL C, ASIL D. ASIL D dictates the highest integrity requirements on the product and ASIL A the lowest (see, e.g., http://en.wikipedia.org/wiki/Automotive_Safety_Integrity_Level).

A message authentication code (often MAC) is a short piece of information used to authenticate a message and to provide integrity and authenticity assurances on the message. Integrity assurances detect accidental and intentional message changes, while authenticity assurances affirm the message's origin. A MAC algorithm, sometimes called a keyed (cryptographic) hash function (however, cryptographic hash function is only one of the possible ways to generate MACs), accepts as input a secret key and an arbitrary-length message to be authenticated, and outputs a MAC (sometimes known as a tag). The MAC value protects both a message's data integrity as well as its authenticity, by allowing verifiers (who also possess the secret key) to detect any changes to the message content (see, e.g., http://en.wikipedia.org/wiki/Message_authentication_code).

It is noted that according to the examples provided herein, any hash function, cryptographic hash function or the like may be used to generate an identifier. Symmetric encryption (using, e.g., a common secret as key) or asymmetric encryption (using, e.g., public key cryptography) can be used to generate the identifier. The identifier may in particular be a digital signature.

Within the context of fail-safe processors with explicit fail-safe provisions on hardware level, a need arises to perform fail-safe comparisons in a security processor that may not have an explicit fail-safe provision on its hardware level.

The security processor may be a high security module (HSM) that performs cryptographic operations to obtain identifiers, e.g., cryptographic identifier signatures. Cryptographic signatures are compared with supplied reference signatures that may typically originate from an external source. A critical failure scenario for such comparison is that due to an error of the HSM the comparison between the calculated signature at the HSM and the reference signature always leads to a result that appears to be correct, whereas it may be incorrect, because the HSM does not work properly and always provides the same result. Such error scenario is also referred to as "stuck-at" fault.

Examples presented herein efficiently overcome the "who checks the checker" problem providing a high level of safety without weakening the security of the solution. Also, stuck-at faults of the security processor can be detected without any need for additional provisions of hardware.

Examples provided herein suggest applying a double execution of an operation at the security processor (triggered, e.g., by a master processor):

A first operation (comparison operation) may be run at the security processor, wherein the first operation may be based on a first identifier and on input data. The security processor may determine a second identifier based on the input data and compare the first identifier and the second identifier.

A second operation (verify operation) may be run at the security processor based on the second identifier and based on a modified first identifier.

The modified first identifier may be, e.g., a bit-wise inversion of the first identifier (e.g., "0111010" inverted to "1000101"). The modified first identifier may be supplied by the master processor or it may be computed at the security processor.

The modified first identifier may be obtained by applying at least one logical operation on the first identifier.

The first operation and the second operation may each be a compare-type operation. Hence, at least parts of the first and second operation may be similar or identical.

A result of the compare operation and a result of the verify operation may be (separately or together, e.g., combined) conveyed back to the master processor. The master processor may then determine based on the results, whether the overall operation was successful, i.e., whether the comparison revealed the same identifiers and whether the security processor (including its interface) works properly. Hence, the master processor is able to confirm or deny the validity of the identifier and proceed based on such findings.

In one embodiment the first and second operations lead to different results, which are conveyed to the master processor. For example: A result "1" of the first operation may indicate that the comparison operation determined that the first identifier and the second identifier are identical, whereas "0" may indicate that the identifiers are not identical. A result "0" of the second operation may indicate that the verify operation was successful based on the modified first identifier, whereas "1" may indicate that this verify operation was not successful.

Hence, the results "1" of the first operation and "0" of the second operation may indicate to the master processor that the identity of the first identifier could be confirmed and that the operation at the security processor (and its interface) is not subject to a stuck-at fault.

Hence, the first and second operations leading to different results may indicate that the security processor (and its interface) works correctly.

Figure 3:
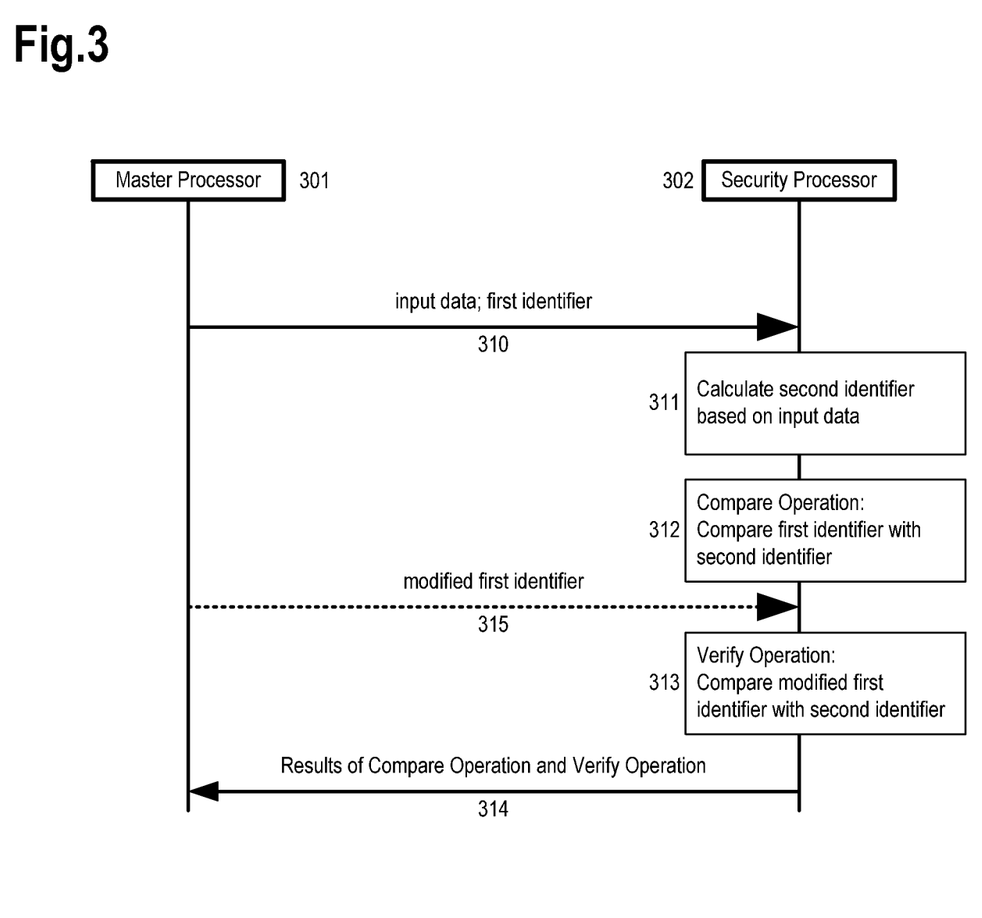
FIG. 3 shows a schematic flow chart between a master processor and a security processor, wherein the master processor uses the security processor to verify a first identifier.

FIG. 3 shows a schematic flow chart between a master processor 301 and a security processor 302. In a message 310, the master processor 301 supplies input data and a first identifier to the security processor 302.

At 311, the security processor 302 computes a second identifier based on the input data. This may be achieved by applying the same coding scheme that was used to generate the first identifier. The coding scheme may comprise a one-way function or cryptographic function and it may use a secret (key) known to the entities that should be entitled to apply the coding scheme. As an alternative, the coding scheme may utilize public-key cryptography.

At 312, the security processor 302 conducts a compare operation comparing the first identifier with the second identifier.

At 313, the security processor 302 conducts a verify operation comparing the second identifier with a modified first identifier. In one embodiment the modified first identifier is based on the first identifier. The modified first identifier may be obtained by (bit-wise) applying a logic operation (e.g., an bit-wise inversion) on the first identifier. The modified first identifier may optionally be (determined and) provided by the master processor 301 (see message 315).

At 314, the security processor 302 conveys at least one result of the compare operation and of the verify operation to the master processor 301.

It is an option that the result of the compare operation is conveyed to the master processor 301 after the act 312 and the result of the verify operation is conveyed to the master processor 301 after the act 313. It is also an option that both results are conveyed to the master processor 301 after the act 313. Conveying the at least one result may be achieved via a single message or via several messages.

It is a further option that the compare operation and the verify operation may be interchanged.

It is also an option that the verify operation is not conducted in case the compare operation revealed an error. In such case a result indicating the error and/or type of error may be conveyed from the security processor 302 to the master processor 301.

The examples described herein bear the advantage of a high and systematic coverage for relevant failures that may hence be detectable via software without the need for dedicated fault-detection hardware.

It is also an advantage that transient faults may be detected by the two executions, i.e. the first and the second operation. Permanent faults are detected via the second operation utilizing the modified first identifier, which is different from the first identifier and may thus lead to a different comparison result.

As indicated, the modified first identifier may be a bit-wise inversion of the first identifier.

It is in particular an option that the first operation comprises an exclusive-or (EXOR) operation based on the (bits of the) first identifier and the (bits of the) second identifier. For each bit of the first identifier a result of the bit-wise EXOR operation is inverted and AND-linked with a previous result, wherein the previous result is logical "1" in case at least one previous comparison indicated identity between bits of the first identifier and the second identifier or in case no bits have been compared before and the previous result is logical "0" in case at least one previous comparison indicated a discrepancy between bits of the first identifier and the second identifier.

Figure 2:
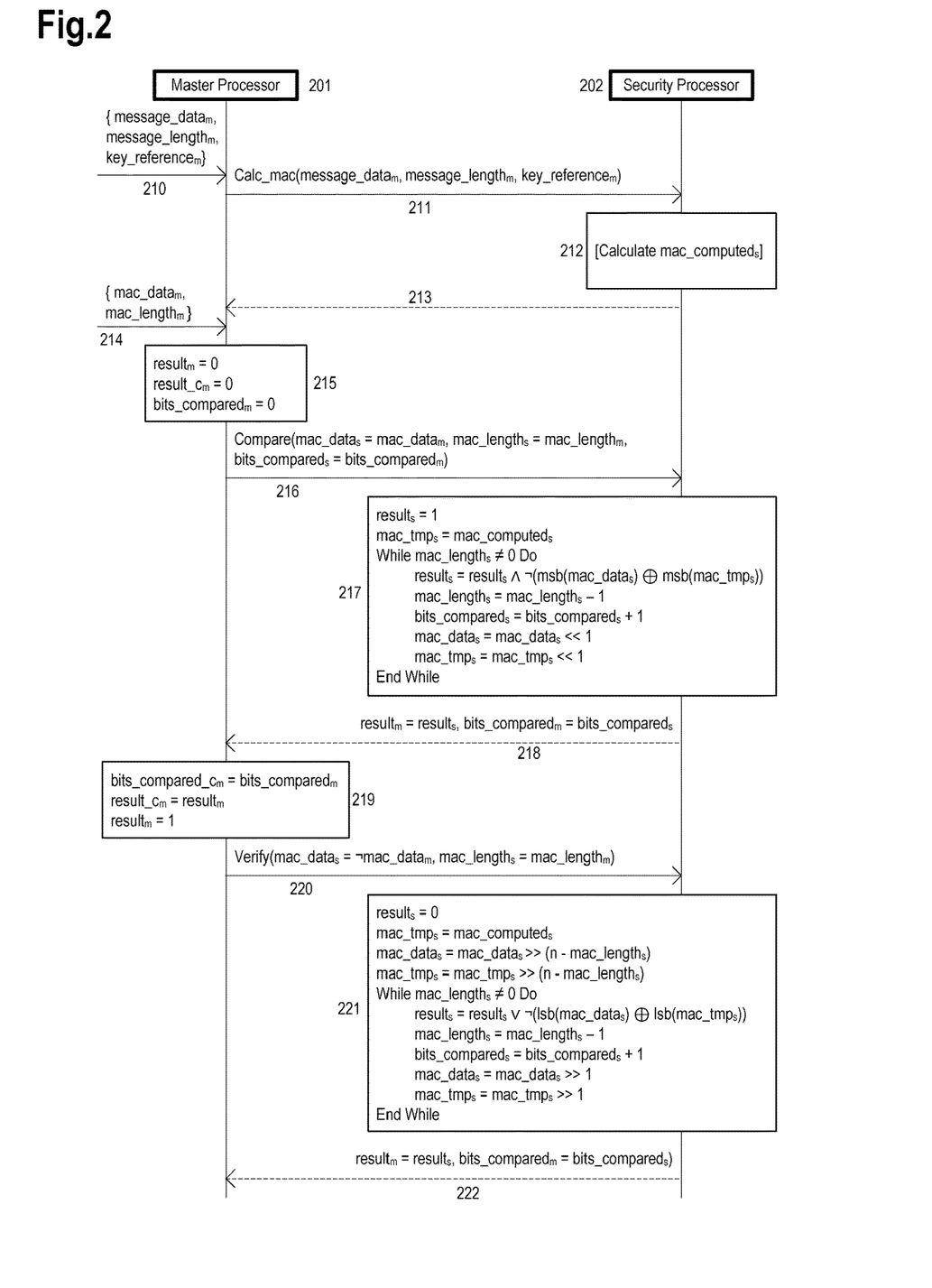
FIG. 2 shows a schematic flow chart between the master processor and the security processor depicting a procedure that helps revealing stuck-at faults at the security processor's operation or interface.

The first operation may thus indicate via a logic "1" that the comparison between first and second identifier was successful (identity of the identifiers) or via a logic "0" that this comparison failed. The outcome of this first operation may be conveyed as first result to the master processor 201, 301.

It is also an option that the second operation comprises an (EXOR) operation based on the (bits of the) modified first identifier and the (bits of the) second identifier. For each bit of the modified first identifier a result of the bit-wise EXOR operation is inverted and OR-linked with a previous result, wherein the previous result is logical "1" in case at least one previous comparison indicated identity between bits of the modified first identifier and the second identifier and the previous result is logical "0" in case at least one previous comparison indicated a discrepancy between bits of the modified first identifier and the second identifier or in case no bits have been compared before.

The second operation may thus indicate via a logic "0" that the verification between the modified first identifier and the second identifier was successful (i.e. the identifiers are not identical) or via a logic "1" that this verification failed. The outcome of this second operation may be conveyed as second result to the master processor 201, 301.

Hence, a signature mechanism may provide a complete end-to-end coverage of message data integrity from the context of the sending software component to the context of the receiving software component.

Example Embodiment Using Message Authentication Codes

A system may comprise multiple processing units, each processing unit may comprise at least one master processor ($P_m$) and a security processor ($P_s$), which may be connected via an inter-processor communication, e.g., a shared memory.

The security processor $P_s$ may generate and verify message authentication codes (MACs), which may be obtained via a cipher-based MAC algorithm (CMAC). In this example, the MACs are the identifiers described above.

The CMAC is a block cipher-based message authentication code algorithm. It may be used to provide assurance of the authenticity and, hence, the integrity of binary data (see, e.g., http://en.wikipedia.org/wiki/CMAC).

Figure 1:
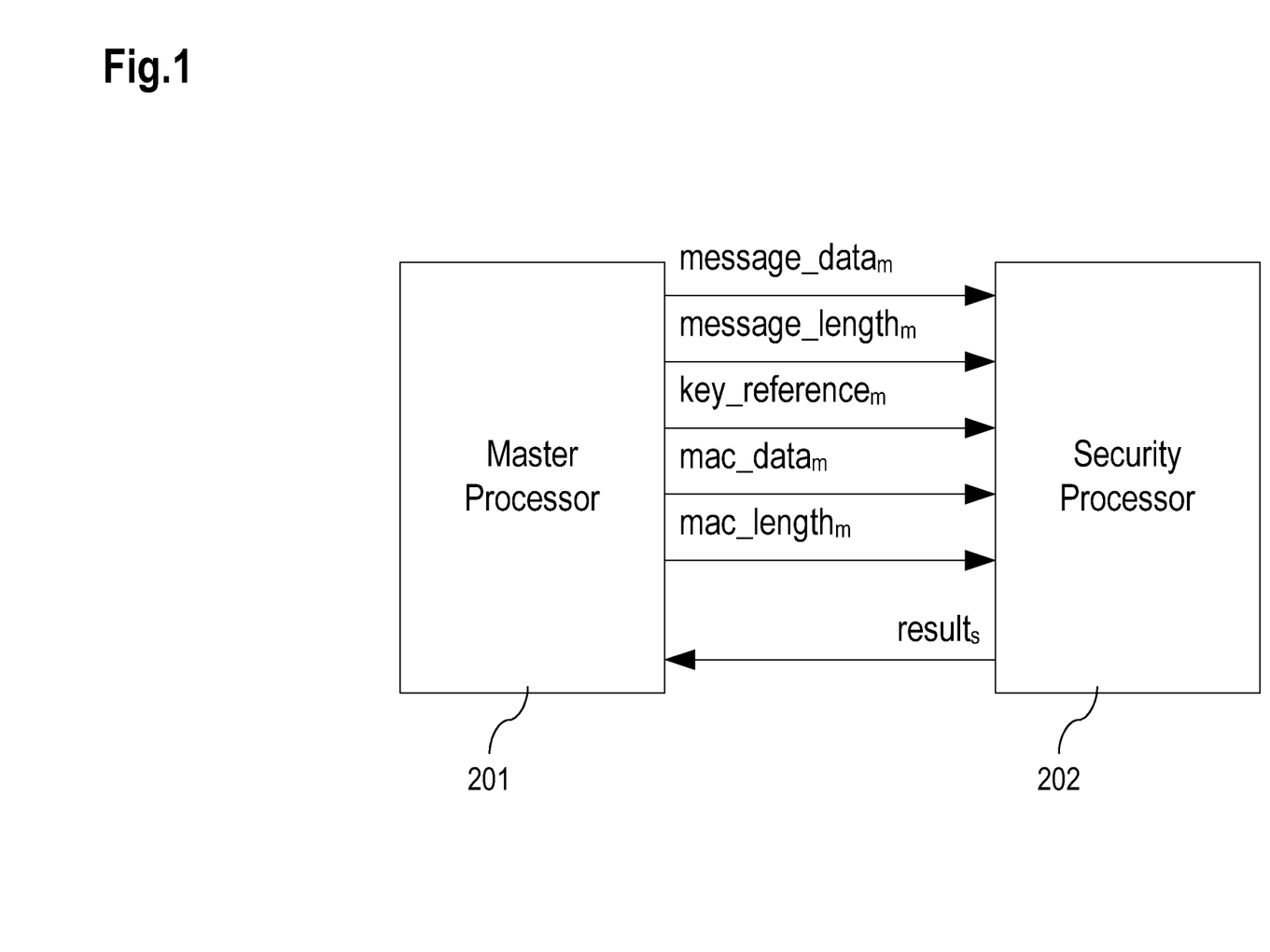
FIG. 1 shows an example diagram of a master processor and a security processor, wherein an interface between the master and the security processor may utilize a set of data elements.

FIG. 1 shows an example diagram of a master processor 201 ($P_m$) and a security processor 202 ($P_s$), wherein an interface between the master processor $P_m$ and the security processor $P_s$ may utilize at least one of the following data elements:

From the master processor $P_m$ to the security processor $P_s$:
a data element message_data$_m$ comprising the message data that needs to be verified;
a data element message_length$_m$ comprising the length of the message data;
a data element key_reference$_m$ comprising a reference to a specific key within the security processor $P_s$;
a data element mac_data$_m$ comprising the (e.g., received) MAC (also referred to as identifier) for the message_data$_m$;
a data element mac_length$_m$ comprising the number of relevant MAC bits to be considered for verification.

From the security processor $P_s$ to the master processor $P_m$:
a data element result$_s$ comprising at least one result of operation (e.g., comparison and/or verification) performed by the security processor.

It is noted that the data element mac_data$_m$ is to be verified by the security processor 202 such that the master processor 201 is able to continue operation under the assumption that this identifier (which may be supplied from an external source to the master processor 201) is valid and authentic, i.e. to "verify" this identifier. In this regard, the security processor 202 may conduct several operations that may be referred to as compare operation and/or verify operation. However, in the examples described herein there is no strict separation between a compare and a verify operation, they are used to differentiate between (e.g., two) operations that pursue the objective to verify (confirm the validity and integrity of) the identifier as a service provided to the master processor.

The index "m" indicates that the data element is provided or used by the master processor and the index "s" indicates that the data element is provided or used by the security processor.

In order to utilize the CMAC for functional safety at least one of the following is suggested for verifying message authentication codes:

Upon verifying a message authentication code the security processor $P_s$ may not return a CMAC match in the event of a fault within the security processor $P_s$ or within the interface between the security processor $P_s$ and the master processor $P_m$ (also referred to as the security processor's interface).

The data element mac_length$_m$ determines a number of data bits of the MAC that may be considered for the comparison. It may be determined whether a number of data bits other than mac_length$_m$ is used by the comparison.

Safety measures may be provided that fulfill the safety integrity requirements according to ASIL D.

The security processor $P_s$ may be arranged such that it does not disclose its (secret) keys or any data such as signatures that would facilitate reverse engineering of the keys. This may in particular apply also in the event of a fault within the security processor $P_s$ (or its interface towards the master processor $P_m$).

Diagnostic means may be provided that allow differentiating between corrupted signatures and a fault of the security processor or its interface (a permanent product fault that reveals the same comparison results) to the master processor.

In an example scenario, the master processor $P_m$ may initiate a calculation of a MAC on the security processor by providing the data elements
message_data$_m$,
message_length$_m$, and
key_reference$_m$
to the security processor $P_s$. The security processor $P_s$ may apply the CMAC utilizing the key (key_reference$_m$) on the data (message_data$_m$) leading to a data element mac_computed$_s$ (the second identifier according to the example described with regard to FIG. 3) that contains the computed MAC.

These data elements mentioned may be subject to the following errors:
message_data$_m$: As an error, the message data may be corrupted. This error is detectable via the data element mac_computed$_s$ by a MAC compare operation.
message_length$_m$: As an error, the message length may be changed. This error is detectable via the data element mac_computed$_s$ by the MAC compare operation.
key_reference$_m$: As an error, the key reference may have changed. This error is detectable via the data element mac_computed$_s$ by the MAC compare operation.
mac_computed$_s$: As an error, the MAC calculation may be corrupted. This error is detectable via the data element mac_computed$_s$ by the MAC compare operation.

Hence, the faults are detectable through the cryptographic strength of the CMAC and by comparing the calculated MAC mac_computed$_s$ with the supplied MAC mac_data$_m$.

Hence, the master processor $P_m$ may initiate a comparison by providing the data elements
mac_data$_m$ and
mac_length$_m$
to the security processor $P_s$. The security processor conducts the comparison and the verification leading to the data element result$_s$.

Corrupted MAC data is detectable via the MAC comparison operation.

However, the following faults are not detectable and require additional safety measures:
- a fault in the provided MAC length (such as MAC length changed to 1),
- a fault in the MAC comparison operation,
- a fault in the result used to return the comparison status, and
- a complete failure to return a comparison status.

A counter may be used for the compare operation that counts the bits compared by the operation conducted at the security processor. The counter value may be returned to the master processor and it may be compared with the data element mac_length$_m$ to detect a corruption of the security processor (or its interface).

A second operation (also referred to as verify operation) may use a modified identifier, e.g., a coded version of the data element mac_data, to detect stuck-at faults (i.e. faults that due to an error of the device or algorithm produce the same results) in the result of an operation run at the security processor. A coded version of the data element may comprise a bit-wise inversion of the data element mac_data$_m$ (optionally together with at least one other bit-operation applied on this data element).

An initialization of variables and/or counters within the master processor and/or the security processor may be used to detect such stuck-at faults.

FIG. 2 shows a schematic flow chart between the master processor 201 and the security processor 202 depicting a procedure that helps revealing stuck-at faults at the security processor's operation or interface.

At 210, data elements
message_data$_m$,
message_length$_m$,
key_reference$_m$
are obtained from an external source (not shown) or they may be determined by the master processor 201.

The master processor 201 conveys these data elements to the security processor 202 (see message 211). At 212, the security processor 202 calculates the MAC, i.e. a data element mac_computed$_s$, based on the data elements obtained in the message 211.

The information that the data element mac_computed$_s$ has been computed by the security processor 202 may optionally be indicated to the master processor 201 via a message 213.

At 214, data elements
mac_data$_m$ and
mac_length$_m$
are obtained from an external source (not shown) or they may be determined by the master processor 201.

At 215, the following variables are initialized at the master processor 201: result$_m$, result_c$_m$ and bits_compared$_m$ are set to 0.

The master processor 201 conveys a message 216 comprising the data elements mac_data$_m$, mac_length$_m$ and the variable bits_compared$_m$ to the security processor 202 requesting a compare operation.

At 217 the security processor 202 conducts the compare operation:

```
result_s = 1
mac_tmp_s = mac_computed_s
While mac_length_s ≠ 0 Do
    result_s = result_s ∧ ¬(msb(mac_data_s) ⊕ msb(mac_tmp_s))
    mac_length_s = mac_length_s - 1
```

```
    bits_compared_s = bits_compared_s + 1
    mac_data_s = mac_data_s << 1
    mac_tmp_s = mac_tmp_s << 1
End While
```

Hence, the variable result$_s$ is initialized with "1". Within the while-loop (i.e. as long as not all bits indicated by mac_length are processed) the data elements mac_data$_s$ (which corresponds to mac_data$_m$ provided by the master processor 201) and mac_tmp$_s$ (which corresponds to mac_computed$_s$) are bit-wise compared with each other (utilizing an EXOR operation, ⊕). The result of the EXOR operation is inverted (indicated by "¬") and AND-linked (indicated by "∧") with the result$_s$. As the example algorithm shown above processes the data elements bit-wise (indicated by msb(A), which results in the most-significant bit of A and by the "<<" operator which results in a one-bit left shift), at the end of the while-loop result$_s$ has the value "1" in case the comparison was successful and the value "0" in case the comparison was not successful for at least one bit.

In a message 218, the security processor 202 returns the data element result$_s$ and the variable bits_compared$_s$, which contains the number of bits compared. Hence, the master processor 201 may compare mac_length$_m$ with bits_compared$_m$ and detect an error in case both values are not the same.

The data element result$_s$ from the security processor 202 is stored as a data element result_$_{cm}$ and the variable bits_compared$_s$ is stored as a variable bits_compared_$_{cm}$ at the master processor 201 at 219. Also, the variable result$_m$ is initialized with "1" at 219.

The master processor 201 conveys a message 220 comprising the bit-inverted data element mac_data$_m$ and the data element mac_length$_m$ to the security processor 202.

At 221 the security processor 202 conducts the verify operation:

```
result_s = 0
mac_tmp_s = mac_computed_s
mac_data_s = mac_data_s >> (n - mac_length_s)
mac_tmp_s = mac_tmp_s >> (n - mac_length_s)
While mac_length_s ≠ 0 Do
    result_s = result_s ∨ ¬(lsb(mac_data_s) ⊕ lsb(mac_tmp_s))
    mac_length_s = mac_length_s - 1
    bits_compared_s = bits_compared_s + 1
    mac_data_s = mac_data_s >> 1
    mac_tmp_s = mac_tmp_s >> 1
End While
```

Hence, the variable result$_s$ is initialized with "0". Within the while-loop (i.e. as long as not all bits indicated by mac_length are processed) the data elements mac_data$_s$ (which corresponds to the coded version of the data element mac_data$_m$, here the inverted data element mac_data (indicated by "¬"), provided by the master processor 201) and mac_tmp$_s$ (which corresponds to mac_computed$_s$) are bit-wise compared with each other (utilizing an EXOR operation, ⊖). The result of the EXOR operation is inverted (indicated by "¬") and OR-linked (indicated by "∨") with the result$_s$. As the example algorithm shown above processes the data elements bit-wise (indicated by lsb(A), which results in the least-significant bit of A and by the ">>" operator which results in a one-bit right shift), at the end of the while-loop result$_s$ has the value "0" in case the comparison was successful and the value "1" in case the comparison was not successful for at least one bit.

The example above right-shifts "$mac\_data_s$" by an amount of "$n\text{-}mac\_length_s$" bits in order to reveal the bits to be used for the compare operation. The same concept applies for the pre-processing of "$mac\_tmp_s$."

In a message 222, the security processor 202 returns the data element $result_s$ and the variable $bits\_compared_s$, which contains the number of bits compared. Hence, the master processor 201 may compare $mac\_length_m$ with $bits\_compared_m$ and detect an error in case both values are not the same.

This result $result_s$ is stored in the data element $result_m$ and the number of bits compared is stored in the variable $bits\_compared_m$ for further processing at the master processor 201.

In this example, the results $result\_{cm}$ of the compare operation (act 217) shows "1" in case the compare operation between the data element $mac\_data_m$ supplied by the master processor 201 to the security processor 202 and the data element $mac\_computed_s$ determined at the security processor 202 was successful also within the number of bits determined by the $mac\_length_m$;

$result\_{cm}$ of the compare operation (act 217) shows "0" in case the compare operation between the data element $mac\_data_m$ supplied by the master processor 201 to the security processor 202 and the data element $mac\_computed_s$ determined at the security processor 202 was not successful for the number of bits determined by the $mac\_length_m$;

$result_m$ of the verify operation (act 221) provides "0" in case the compare operation between the inverted data element $mac\_data_m$ supplied by the master processor 201 to the security processor 202 and the data element $mac\_computed_s$ determined at the security processor 202 was successful also within the number of bits determined by the $mac\_length_m$; and $result_m$ of the verify operation (act 221) provides "1" in case the compare operation between the inverted data element $mac\_data_m$ supplied by the master processor 201 to the security processor 202 and the data element $mac\_computed_s$ determined at the security processor 202 was not successful also within the number of bits determined by the $mac\_length_m$.

Hence, the overall comparison and verification failed in case the result $result\_{cm}$ shows "0" or in case the results $result\_{cm}$ and $result_m$ show the same values.

If the variable $bits\_compared\_{cm}$ equals the number of bits determined by $mac\_length_m$ and if the variable $bits\_compared_m$ equals twice the number of $mac\_length_m$, the overall comparison and verification was successful. Otherwise, the signature $mac\_data_m$ could not be successfully verified by the security processor. One reason may be that the signature was incorrect another reason may a defect at the security processor or within its interface.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for processing data comprising calculating a second identifier based on input data, conducting a first operation comparing the second identifier with a first identifier, and conducting a second operation comparing the second identifier with a modified first identifier.

The respective identifier may be based on a cryptographic algorithm (coding scheme) using symmetric or asymmetric cryptography. The identifier may in particular be or comprise a signature. The approach presented herein allows a first processor (also referred to as master processor) to verify the first identifier by sending it to a second processor (also referred to as security processor). Such verification may cover validity and authenticity of the first identifier. In addition, the approach presented allows revealing a stuck-at fault at the security processor or its interface. Hence, the solution advantageously allows for "checking the checker" (i.e. the security processor) without having to supply extra hardware.

Hence, the security processor may be able to determine the second identifier and to compare the second identifier with the first identifier without revealing the content of the second identifier, i.e. maintaining the secrecy of the second identifier within the sphere of the security processor; in addition, stuck-at faults can be revealed that may be based on the security processor indicating a match, wherein in fact there is no such match.

In an embodiment, the method further comprises, prior to calculating the second identifier, receiving the input data and the first identifier from a master processor.

In an embodiment, the method further comprises providing a result of the first operation and a result of the second operation to the master processor.

In an embodiment, the method further comprises, prior to calculating the second identifier, receiving the input data, the first identifier, a length of the first identifier and a key information from a master processor. The method then proceeds by calculating the second identifier based on the input data and the key information, and conducting the first operation by bit-wise comparing the second identifier with a first identifier using the length of the first identifier.

In an embodiment, the method comprises, prior to conducting the second operation, receiving the modified first identifier from a master processor.

As an alternative, the modified first identifier may be determined by the security processor.

In an embodiment, the method further comprises providing a result of the first operation and a result of the second operation to the master processor.

In an embodiment, the method further comprises, prior to conducting the second operation, receiving the modified first identifier and a length of the modified first identifier from a master processor, and then conducting the second operation by bit-wise comparing the second identifier with the modified first identifier using the length of the modified first identifier.

In an embodiment, the modified first identifier is obtained via at least one logical operation applied on the first identifier.

In an embodiment, the modified first identifier is a bit-wise inversion of the first identifier.

In an embodiment, the first identifier and the second identifier are based on a hash function, in particular on a cryptographic hash function.

For example, a MAC may be used as cryptographic hash function. Also, one-way functions of any kind may be used. Symmetric or asymmetric (public-key cryptography) keys may be used to calculate the respective identifier.

In an embodiment, the first operation and the second operation provide different results in case of a successful verification of the first identifier.

In an embodiment,
the first operation comprises an EXOR operation based on the bits of the first identifier and the bits of the second identifier, for each bit of the first identifier a result of the bit-wise EXOR operation is inverted and AND-linked with a previous result, wherein the previous result is logical "1" in case at least one previous comparison indicated identity between bits of the first identifier and the second identifier or in case no bits have been compared before and the previous result is logical "0" in case at least one previous comparison indicated a discrepancy between bits of the first identifier and the second identifier.

The first operation may thus indicate via a logic "1" that the comparison between the first and the second identifier was successful (identity of the identifiers) or via a logic "0" that this comparison failed.

In an embodiment, the second operation comprises an EXOR operation based on the bits of the modified first identifier and the bits of the second identifier, for each bit of the modified first identifier a result of the bit-wise EXOR operation is inverted and OR-linked with a previous result, wherein the previous result is logical "1" in case at least one previous comparison indicated identity between bits of the modified first identifier and the second identifier and the previous result is logical "0" in case at least one previous comparison indicated a discrepancy between bits of the modified first identifier and the second identifier or in case no bits have been compared before.

The second operation may thus indicate via a logic "0" that the verification between the modified first identifier and the second identifier was successful (i.e. the identifiers are not identical) or via a logic "1" that this verification failed.

In an embodiment, the method is run on a security module, in particular a security processor.

A device for checking a first identifier is provided, the device comprising a processing unit that is configured to convey the first identifier and input data to a security processor, and convey a modified first identifier to the security processor. The processing is further configured to obtain a first result of a first operation and a second result of a second operation conducted by the security processor, and assess the first result and the second result.

The security processor may be any processing device that may at least partially be configured to verify identifiers, e.g., via cryptographic operations.

The device checking the first identifier (also referred to as master processor) may be any processing device that has an interface to the security processor, e.g., a shared memory or a communication link.

Conveying or supplying data (e.g., an identifier) in this regard in particular refers to making data available for an addressee. Accordingly, the addressee may obtain data from another component that made it available.

This may be achieved by actively pushing data, e.g., sending data, e.g., via messages, between components. As an alternative, the data may be polled from an addressee or from any other (shared) medium, e.g., a shared memory. For example, inter-processor communication of various kinds can be used to "convey" data from a sending component to a receiving component. It is also an option that the components are connected via a connection, a bus or a network. Such connection can be used to convey the data between the components. Also, data can be sent from one component and received by the addressee component.

In an embodiment, assessing the first result and the second result comprises: initiating a predefined action based on the successfully verified first identifier in case the first result and the second result are different.

In an embodiment, the modified first identifier is a bit-wise inversion of the first identifier.

In an embodiment, the first identifier is obtained from an external component.

Hence, the first identifier may be supplied by an external component and the device needs to verify the validity (and authenticity) of the first identifier.

In an embodiment, the processing unit is configured to convey the first identifier, input data and a length of the first identifier to a security processor, and convey a modified first identifier and a length of the modified first identifier to the security processor. The processing unit is further configured to obtain a first result of a first operation and a second result of a second operation conducted by the security processor, and assess the first result and the second result.

A device for processing data is provided, comprising a processing unit that is configured to obtain a first identifier and input data from a master processor, calculate a second identifier based on the input data, and conduct a first operation comparing the second identifier with the first identifier. The processing unit is further configured to obtain a modified first identifier from the master processor, conduct a second operation comparing the second identifier with the modified first identifier, and convey a result of the first operation and a result of the second operation to the master processor.

In an embodiment, the processing unit is configured to receive the input data, the first identifier, a length of the first identifier and a key information from the master processor, calculate the second identifier based on the input data and the key information, and conduct the first operation by bit-wise comparing the second identifier with a first identifier using the length of the first identifier. The processing unit is further configured to receive the modified first identifier and a length of the modified first identifier from the master processor, and conduct the second operation by bit-wise comparing the second identifier with the modified first identifier using the length of the modified first identifier.

In an embodiment, the modified first identifier is a bit-wise inversion of the first identifier.

A device for checking a first identifier is provided, the device comprising means for obtaining a first identifier and input data from a master processor, means for calculating a second identifier based on the input data, and means for conducting a first operation comparing the second identifier with the first identifier. The device further comprises means for obtaining a modified first identifier from the master processor, means for conducting a second operation comparing the second identifier with the modified first identifier, and means for conveying a result of the first operation and a result of the second operation to the master processor.

A computer program product is suggested, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing data in a security processor comprising:
receiving, at the security processor, input data and a first identifier from a master processor;
calculating a second identifier based on the input data using the security processor;
conducting a first operation comparing the second identifier with the first identifier using the security processor;
receiving, at the security processor, a modified first identifier from the master processor, wherein the modified first identifier is obtained via at least one logical operation applied on the first identifier using the master processor, and wherein the modified first identifier is different from the first identifier;
conducting a second operation comparing the second identifier with the modified first identifier using the security processor; and
providing, using the security processor, a result of the first operation and a result of the second operation to the master processor;
wherein the first identifier is verified successfully when the first identifier matches the second identifier and the first operation and the second operation provide different results; and
wherein the first identifier is not verified successfully when the first operation and the second operation provide the same results.

2. The method according to claim 1, further comprising:
receiving at the security processor the input data, the first identifier, a length of the first identifier and a key information from a master processor, then
calculating the second identifier based on the input data and also with the key information using the security processor; and
conducting the first operation using the security processor by bit-wise comparing the second identifier with the first identifier using the length of the first identifier.

3. The method according to claim 1, further comprising receiving at the security processor the modified first identifier and a length of the modified first identifier from the master processor, and then
conducting at the security processor the second operation by bit-wise comparing the second identifier with the modified first identifier using the length of the modified first identifier.

4. The method according to claim 1, wherein the modified first identifier is a bit-wise inversion of the first identifier.

5. The method according to claim 1, wherein the first identifier and the second identifier are based on a hash function, in particular on a cryptographic hash function.

6. The method according to claim 1,
wherein the first operation comprises an EXOR operation based on the bits of the first identifier and the bits of the second identifier,
wherein for each bit of the first identifier a result of the bit-wise EXOR operation is inverted and AND-linked with a previous result, wherein
the previous result is logical "1" in case at least one previous comparison indicated identity between bits of the first identifier and the second identifier or in case no bits have been compared before and
the previous result is logical "0" in case at least one previous comparison indicated a discrepancy between bits of the first identifier and the second identifier.

7. The method according to claim 1,
wherein the second operation comprises an EXOR operation based on the bits of the modified first identifier and the bits of the second identifier,
wherein for each bit of the modified first identifier a result of the bit-wise EXOR operation is inverted and OR-linked with a previous result, wherein
the previous result is logical "1" in case at least one previous comparison indicated identity between bits of the modified first identifier and the second identifier and
the previous result is logical "0" in case at least one previous comparison indicated a discrepancy between bits of the modified first identifier and the second identifier or in case no bits have been compared before.

8. A non-transitory computer readable medium containing instructions thereon that are directly loadable into a memory of a digital processing device, comprising software code portions for performing the steps of the method according to claim 1.

9. A device for checking a first identifier, comprising a processing unit that is configured to
convey the first identifier and input data to a security processor,
convey a modified first identifier to the security processor, wherein the modified first identifier is obtained via at least one logical operation applied on the first identifier using the processing unit, and wherein the modified first identifier is different from the first identifier;
obtain a first result of a first operation conducted by the security processor and a second result of a second operation conducted by the security processor;
wherein the first operation compares the first identifier with a second identifier calculated by the security processor from the input data and wherein the second operation compares the second identifier with the modified first identifier; and
assess the first result and the second result;
wherein the first identifier is verified successfully when the first identifier matches the second identifier and the first operation and the second operation provide different results; and
wherein the first identifier is not verified successfully when the first operation and the second operation provide the same results.

10. The device according to claim 9, wherein in assessing the first result and the second result the processing unit is further configured to initiate a predefined action based on the successfully verified first identifier in case the first result and the second result are different.

11. The device according to claim 9, wherein the modified first identifier is a bit-wise inversion of the first identifier.

12. The device according to claim 9, wherein the first identifier is obtained from an external component.

13. The device according to claim 9, wherein the processing unit is further configured to
convey a length of the first identifier to the security processor,
convey a length of the modified first identifier to the security processor,
obtain the first result of the first operation and the second result of the second operation conducted by the security processor using the length of the first modified first identifier.

14. A device for processing data, comprising a processing unit that is configured to
obtain a first identifier and input data from a master processor;
calculate a second identifier based on the input data;
conduct a first operation comparing the second identifier with the first identifier;
obtain a modified first identifier from the master processor, wherein the modified first identifier is obtained via at least one logical operation applied on the first identifier using the master processor and wherein the modified first identifier is different from the first identifier;
conduct a second operation comparing the second identifier with the modified first identifier; and
convey a result of the first operation and a result of the second operation to the master processor;
wherein the first identifier is verified successfully when the first identifier matches the second identifier and the first operation and the second operation provide different results; and
wherein the first identifier is not verified successfully when the first operation and the second operation provide the same results.

15. The device according to claim 14, wherein the processing unit is further configured to
receive the input data, the first identifier, a length of the first identifier and a key information from the master processor;
calculate the second identifier based on the input data and the key information;
conduct the first operation by bit-wise comparing the second identifier with the first identifier using the length of the first identifier;
receive the modified first identifier and a length of the modified first identifier from the master processor; and
conduct the second operation by bit-wise comparing the second identifier with the modified first identifier using the length of the modified first identifier.

16. The device according to claim 14, wherein the modified first identifier is a bit-wise inversion of the first identifier.

17. A device for processing data, comprising a processing unit, comprising:
means for obtaining a first identifier and input data from a master processor;
means for calculating a second identifier based on the input data;
means for conducting a first operation comparing the second identifier with the first identifier;
means for obtaining a modified first identifier from the master processor, wherein the modified first identifier is obtained via at least one logical operation applied on the first identifier using the master processor and wherein the modified first identifier is different from the first identifier;

means for conducting a second operation comparing the second identifier with the modified first identifier; and means for conveying a result of the first operation and a result of the second operation to the master processor;

wherein the first identifier is verified successfully when the first identifier matches the second identifier and the first operation and the second operation provide different results; and wherein the first identifier is not verified successfully when the first operation and the second operation provide the same results.

\* \* \* \* \*